US008700523B2

(12) United States Patent  (10) Patent No.: US 8,700,523 B2
Edwards et al.  (45) Date of Patent: Apr. 15, 2014

(54) SYSTEM AND METHOD FOR DELEGATING MANAGEMENT OF A FINANCIAL TRANSACTION ACCOUNT TO A DESIGNATED ASSISTANT

(75) Inventors: Brent M. Edwards, Thornhill (CA); Marc C. Rosenfeld, Thornhill (CA); Robert J. Sondermeyer, Toronto (CA); Jane H. C. Thompson, Markham (CA); Andre R. Wright, Richmond Hill (CA)

(73) Assignee: American Express Travel Related Services Company, Inc., New York, NY (US)

(*) Notice: Subject to any disclaimer, the term of this patent is extended or adjusted under 35 U.S.C. 154(b) by 330 days.

(21) Appl. No.: 11/246,135

(22) Filed: Oct. 11, 2005

(65) Prior Publication Data

US 2006/0282377 A1  Dec. 14, 2006

Related U.S. Application Data

(60) Provisional application No. 60/689,378, filed on Jun. 10, 2005.

(51) Int. Cl.
*G06Q 40/00* (2012.01)
*G06Q 20/00* (2012.01)
*G06Q 50/00* (2012.01)

(52) U.S. Cl.
CPC .............. *G06Q 40/00* (2013.01); *G06Q 20/00* (2013.01); *G06Q 50/00* (2013.01)
USPC ................ 705/39; 705/44; 705/76; 705/325; 705/18; 705/35

(58) Field of Classification Search
None
See application file for complete search history.

(56) References Cited

U.S. PATENT DOCUMENTS

| 5,953,710 | A  | * | 9/1999  | Fleming ........................ 705/38 |
| 6,064,990 | A  | * | 5/2000  | Goldsmith .................... 705/75 |
| 6,073,840 | A  |   | 6/2000  | Marion |
| 6,119,103 | A  | * | 9/2000  | Basch et al. ................... 705/35 |
| 6,523,012 | B1 | * | 2/2003  | Glassman et al. ............. 705/75 |
| 6,594,640 | B1 |   | 7/2003  | Postrel |
| 6,611,881 | B1 | * | 8/2003  | Gottfurcht et al. ............ 710/18 |
| 6,658,393 | B1 | * | 12/2003 | Basch et al. ................... 705/38 |
| 6,820,061 | B2 |   | 11/2004 | Postrel |
| 6,829,586 | B2 |   | 12/2004 | Postrel |

(Continued)

OTHER PUBLICATIONS

International Search Report and the Written Opinion of the International Searching Authority dated Aug. 17, 2007.

(Continued)

*Primary Examiner* — Gregory Johnson
(74) *Attorney, Agent, or Firm* — Snell & Wilmer L.L.P.

(57) ABSTRACT

Systems, methods and computer program products for enabling a holder of a transaction account linked to a financial transaction instrument to delegate management of the transaction account to an assistant. Information relating to the transaction account, including at least identification information relating to the holder of the transaction account, is stored in a database. The database stores financial transaction data relating to financial transactions performed using the financial transaction instrument. A designation of at least one assistant to manage the transaction account on behalf of the holder is accepted and stored. Assistant management authentication data associated with the transaction account is established, to be used by the assistant to execute management instructions at a designated level of management access. An instruction from the assistant is accepted to access transaction data associated with the transaction account.

20 Claims, 7 Drawing Sheets

(56) References Cited

U.S. PATENT DOCUMENTS

| | | | |
|---|---|---|---|
| 6,842,739 | B2 | 1/2005 | Postrel |
| 6,947,898 | B2 | 9/2005 | Postrel |
| 7,089,205 | B1* | 8/2006 | Abernethy ............... 705/37 |
| 7,117,165 | B1* | 10/2006 | Adams et al. ............. 705/26.4 |
| 7,318,041 | B2 | 1/2008 | Walker et al. |
| 7,379,916 | B1* | 5/2008 | Mizrah ................... 705/44 |
| 7,389,256 | B1* | 6/2008 | Adams et al. ............. 705/35 |
| 7,398,225 | B2 | 7/2008 | Voltmer et al. |
| 7,398,226 | B2 | 7/2008 | Haines et al. |
| 7,467,096 | B2 | 12/2008 | Antonucci et al. |
| 7,725,394 | B2* | 5/2010 | Lal et al. ................ 705/44 |
| 7,941,353 | B2* | 5/2011 | King et al. .............. 705/35 |
| 7,949,594 | B2* | 5/2011 | Holm-Blagg ............. 705/37 |
| 8,301,566 | B2* | 10/2012 | Mears .................... 705/44 |
| 2001/0054003 | A1* | 12/2001 | Chien et al. ............. 705/14 |
| 2002/0023040 | A1* | 2/2002 | Gilman et al. ............ 705/37 |
| 2002/0073416 | A1 | 6/2002 | Ramsey Catan |
| 2002/0120585 | A1* | 8/2002 | Talker ................... 705/75 |
| 2002/0128917 | A1* | 9/2002 | Grounds ................. 705/26 |
| 2003/0004870 | A1* | 1/2003 | Van Rensburg et al. ..... 705/39 |
| 2003/0083985 | A1* | 5/2003 | Chen et al. .............. 705/39 |
| 2003/0144957 | A1* | 7/2003 | Skinner .................. 705/42 |
| 2003/0171992 | A1* | 9/2003 | Blagg et al. ............. 705/14 |
| 2003/0216960 | A1 | 11/2003 | Postrel |
| 2004/0030657 | A1* | 2/2004 | Holm-Blagg et al. ....... 705/65 |
| 2004/0073511 | A1* | 4/2004 | Beaumont et al. ......... 705/42 |
| 2004/0097287 | A1 | 5/2004 | Postrel |
| 2004/0098337 | A1* | 5/2004 | Gudgeon et al. .......... 705/42 |
| 2004/0220854 | A1 | 11/2004 | Postrel |
| 2004/0236632 | A1* | 11/2004 | Maritzen et al. .......... 705/26 |
| 2005/0021399 | A1 | 1/2005 | Postrel |
| 2005/0021400 | A1 | 1/2005 | Postrel |
| 2005/0021401 | A1 | 1/2005 | Postrel |
| 2005/0080691 | A1* | 4/2005 | Holm-Blagg .............. 705/30 |
| 2005/0080727 | A1 | 4/2005 | Postrel |
| 2005/0097017 | A1* | 5/2005 | Hanratty ................. 705/35 |
| 2005/0149386 | A1* | 7/2005 | Agura et al. ............. 705/14 |
| 2005/0149394 | A1 | 7/2005 | Postrel |
| 2005/0192897 | A1* | 9/2005 | Rogers et al. ............ 705/40 |
| 2005/0222906 | A1 | 10/2005 | Chen |
| 2005/0240472 | A1 | 10/2005 | Postrel |
| 2006/0020511 | A1 | 1/2006 | Postrel |
| 2006/0097036 | A1* | 5/2006 | Koenigsman et al. ....... 235/379 |
| 2006/0282377 | A1* | 12/2006 | Edwards et al. ........... 705/39 |
| 2007/0179840 | A1 | 8/2007 | Kroner et al. |
| 2007/0185769 | A1 | 8/2007 | Hood et al. |
| 2007/0198335 | A1* | 8/2007 | Edwards et al. ........... 705/14 |
| 2007/0260509 | A1 | 11/2007 | Hines et al. |
| 2008/0015987 | A1* | 1/2008 | Ramavarjula et al. ....... 705/44 |
| 2009/0275363 | A1* | 11/2009 | McGregor et al. .......... 455/558 |
| 2013/0024384 | A1 | 1/2013 | Beenau et al. |

OTHER PUBLICATIONS

International Search Report on Patentability of International Application PCT/US20061022464, Apr. 9, 2009.
Office Action dated May 8, 2012 in U.S. Appl. No. 11/246,139.
Office Action dated Mar. 20, 2009 in U.S. Appl. No. 11/246,139.
Office Action dated Aug. 14, 2008 in U.S. Appl. No. 11/246,139.
"Core One Credit Union—Discover the Advantage",< http://coreone.org/2visa.html >,Copyright 2001, (Last Visited Oct. 9, 2002), 2 pages.
Liam Lahey, "Microsoft Bolsters Rebate Structure", Computer Dealer News (Feb. 8, 2002), 2 pages.
Joan Goldwasser, "Best of the Cash-back Cards", Kiplinger's Personal Finance Magazine (Apr. 1999), 2 pages.
Gordon Carey, "Multi-tier Capay", Pharmaceutical Executive (Feb. 2000), 7 pages.
"New Evidence about Positive Three-Tier Co-pay Performance Presented at Express Scripts 2000 Outcomes Conference", PR Newswire Association, Inc. (Jun. 28, 2000), 7 pages.
Eric Schmuckler, "Playing Your Cards Right", Forbes (Dec. 28, 1987), 2 pages.
Mary Kuntz, "Credit Cards as Good as Gold", Forbes (Nov. 4, 1985), 2 pages.
Judy Nyman, "Free Income Tax Clinics are Opening as Apr. 30 Deadline Draws Nearer", The Toronto Star (Mar. 25, 1986, Final Edition), 2 pages.
Michael Obel, "Oil Companies Push Marketing, Cost Cutting to Fortify Earnings", Oil & Gas Journal (Sep. 16, 1985), 6 pages.
"The Chase Manhattan Bank Today Announced a Comprehensive Program to Enhance the Value of All its Credit Cards", PR Newswire (Dec. 18, 1986), 2 pages.
"Credit Cards Offer Travelers New Benefit", PR Newswire (Aug. 5, 1987), 1 page.
"Shell Introduces Optional Credit Card", The Associated Press (Sep. 3, 1985), 1 page.
"Shell-Oil; Introduces Shell Signature Travel and Entertainment Credit Card", Business Wire (Sep. 3, 1985), 1 page.
"Prestige Credit Cards: Those Pricey Plastics", Changing Times (Apr. 1986), 2 pages.
"Shell Introducing Expanded 'Signature' Credit Card", Tulsa Business Chronicle (Sep. 9, 1985), 2 pages.
Final Office Action dated Oct. 2, 2012 in U.S. Appl. No. 11/246,139.
Advisory Action dated Dec. 18, 2012 in U.S. Appl. No. 11/246,139.
Office Action dated May 7, 2013 in U.S. Appl. No. 11/246,139.
Final Office Action dated Oct. 9, 2013 in U.S. Appl. No. 11/246,139.
Office Action dated Aug. 15, 2013 in Canadian Application No. 2,610,770.

* cited by examiner

SYSTEM AND METHOD FOR DELEGATING MANAGEMENT OF A FINANCIAL TRANSACTION ACCOUNT TO A DESIGNATED ASSISTANT

CROSS REFERENCE TO RELATED APPLICATIONS

This application claims priority to, and the benefit of, U.S. Provisional Patent Application No. 60/689,378, filed Jun. 10, 2005.

BACKGROUND OF THE INVENTION

1. Field of the Invention

The present invention generally relates to delegating management of a financial transaction account, and more particularly to enabling a holder of a transaction account linked to a financial transaction instrument to delegate a specific level of management access of an account to a designated assistant.

2. Related Art

A business executive who has a financial transaction instrument associated with a transaction account (e.g., a credit card) may wish to have an executive assistant attend to the details of managing the account, such as reviewing and verifying transactions, making inquiries regarding specific transactions, etc. However, there has been until now a lack of clear, systematic procedures for delegating management of a transaction account to an executive assistant. Thus, account holders must often resort to informal means for effecting such delegation, which can be cumbersome and inefficient and may not provide the proper procedural or legal basis for such delegation.

One conventional method for informally delegating management of an account to an assistant is for the account holder to send a letter or facsimile to the card issuer requesting that the assistant be given access to the account. However, such correspondence, because it is composed by the account holder, who in most cases is not expert in the applicable legal considerations, often does not meet the legal requirements or the card issuer's procedural requirements for proper authorization. Account holders may also contact the card issuer by telephone to request delegation of management to an assistant, but again, this informal communication may not meet all of the procedural or legal requirements for proper authorization and may be unacceptable to the card issuer due to concerns regarding account security, as well. In addition, the lack of a systematic way of maintaining information relating to the designation of assistants may result in this information being inadvertently overlooked by those responsible for retrieving account information, which may result in the assistant being denied access to the account information, even where the assistant has been provided with authorization that complies fully with the law and the card issuer's requirements.

Another conventional method for informally delegating management of an account to an assistant involves the account holder giving their online user-identifier and password to the assistant to allow access to the transaction account via the Internet. However, this raises account security concerns and may violate the online access user agreement between the account holder and the card issuer. Furthermore, under this scenario, the account holder cannot control the level of access granted to the assistant. The assistant may be allowed to perform functions that the account holder does not wish to delegate, such as changing the mailing address for the account, requesting a credit line increase, applying for other transaction accounts, etc. Even worse, an account holder might give the assistant personal information, such as their social security number, and may instruct the assistant to telephone the card issuer pretending to be the account holder. Such an approach would almost certainly not meet procedural or legal requirements for proper authorization and raises the specter of identity theft and other serious security concerns.

As mentioned above, among the shortcomings of these ad hoc methods is the concern that such informal approaches do not satisfy all of the procedural or legal requirements to effectuate proper delegation of transaction account management. In addition, these methods lack a systematic mechanism for the account holder to monitor or otherwise control the management functions being carried out on their behalf. In particular, these conventional methods do not allow the account holder to control the level of access granted to the assistant. Moreover, there is at present no convenient mechanism for an account holder to establish, change, or revoke delegation of account management, for instance, via an online system.

Given the foregoing, what is needed is a system, method and computer program product for delegating management of a financial transaction account to a designated assistant. Specifically, there exists a need for formalized and systematic delegation of management of the transaction account by an account holder to a designated assistant, in a manner that satisfies the procedural and legal requirements associated with such authorization. There is also a need for a system that allows the account holder to set a level of access for the delegation, such that the assistant only has access to a predetermined set of account management functions. Further still, there is a need for a system that allows an account holder to establish, change, or revoke delegation of account management via an online system.

BRIEF DESCRIPTION OF THE INVENTION

The present invention meets the above-identified needs by providing a system, method and computer program product for delegating management of a financial transaction account to a designated assistant.

In accordance with one embodiment of the present invention, there is provided a method for enabling a holder of a transaction account linked to a financial transaction instrument to delegate management of the transaction account to an assistant that proceeds by storing, in a database, information relating to the transaction account, the information including at least identification information relating to the holder of the transaction account, the database being structured to store financial transaction data relating to financial transactions performed using the financial transaction instrument, followed by accepting and storing a designation of at least one assistant to manage the transaction account on the holder's behalf. The method further includes establishing assistant management authentication data associated with the transaction account, to be used by the assistant(s) to execute management instructions at a designated level of management access, and accepting a management instruction from the assistant(s) to access transaction data associated with the transaction account.

In accordance with another embodiment of the present invention, there is provided a method for enabling a holder of a transaction account linked to a financial transaction instrument to delegate management of the transaction account to an assistant that further includes accepting and storing a designation of the level of management access defining a set of actions the assistant is authorized to perform in managing the transaction account. In an instance where the holder of the transaction account designates more than one assistant to help manage their account, one version of the invention the holder is able to designate different levels of management access for the respective assistants.

In accordance with another embodiment of the present invention, there is provided a method for enabling a holder of a transaction account linked to a financial transaction instrument to delegate management of the transaction account to an assistant that further includes receiving the management instructions from the assistant over the Internet.

In accordance with yet another embodiment of the present invention, there is provided a method for enabling a holder of a transaction account linked to a financial transaction instrument to delegate management of the transaction account to an assistant that further includes accepting and storing the designation of the assistant and establishing the assistant management authentication data at a single integrated server.

An advantage of the present invention is that it relieves the account holder of the tedium of quotidian account management functions, such as reviewing and making inquiries regarding transactions on the account, and instead allows these functions to be more suitably performed by an assistant. The present invention also obviates the need for account holders to resort to informal means for effecting such delegation, which, in addition to being inefficient and cumbersome, can raise legal and procedural concerns over the bases for such delegation.

Another advantage of the present invention is that it provides a systematic way of maintaining information relating to the designation of assistants, which helps prevent this information from being inadvertently overlooked by those responsible for retrieving account information. The present invention also provides additional security for account holders by allowing them to select a level of management access for their designated assistants to help prevent fraudulent or other unauthorized actions from being performed by a designated assistant.

Yet another advantage of the present invention is that it conveniently allows an account holder to establish, change, or revoke delegation of account management (e.g., via an online system).

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

I. Overview

Figure 1:
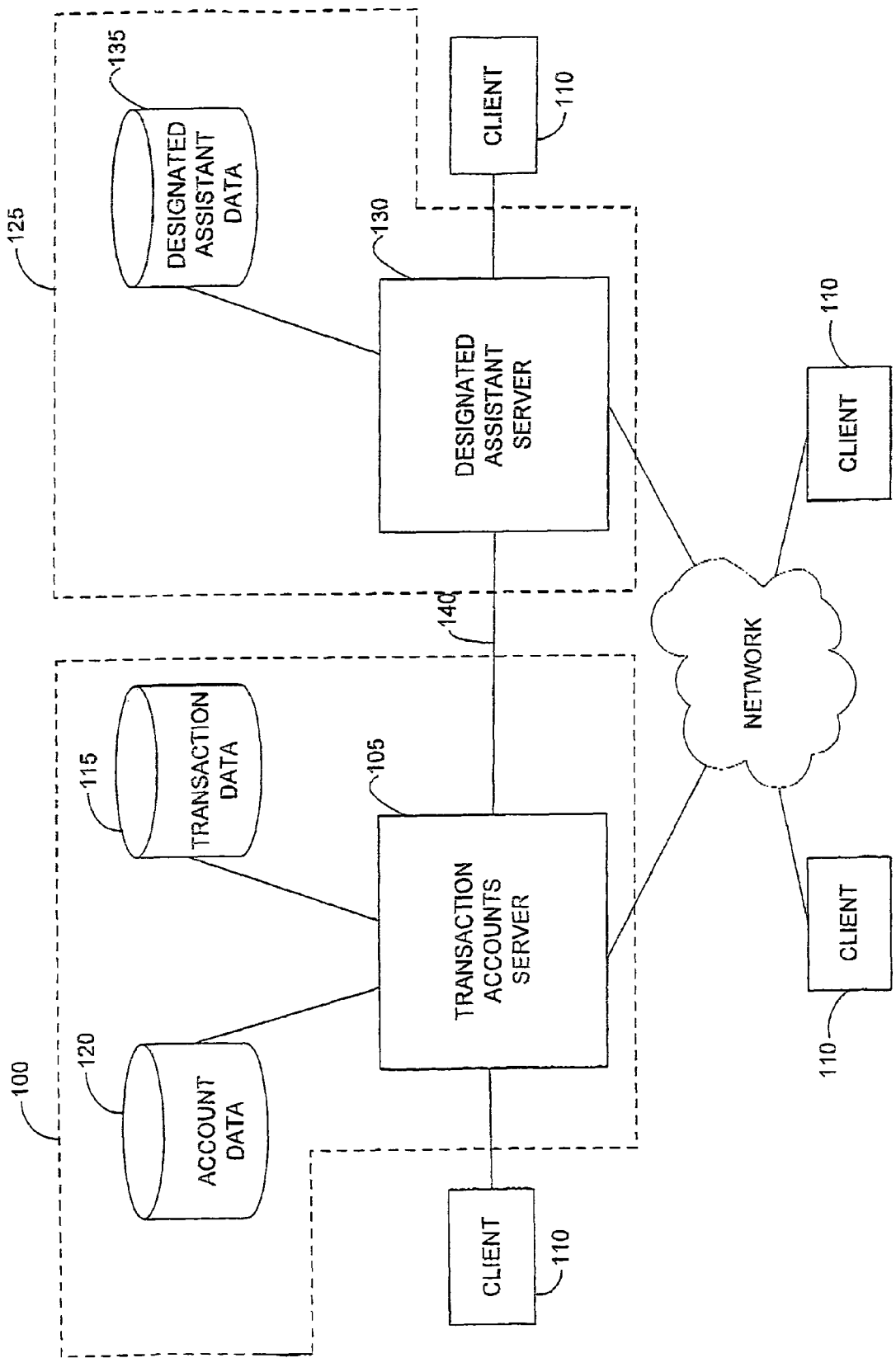
FIG. 1 is a block diagram illustrating a transaction accounts system and a designated assistant system maintained by the transaction instrument issuer in accordance with one embodiment of the present invention.

The present invention is described in more detail herein in terms of an exemplary implementation. This is for convenience only and is not intended to limit the application of the present invention.

Generally, the present invention is directed to a system, method and computer program product for allowing an account holder to designate an assistant to manage a transaction account linked to a financial transaction instrument, such as a credit card, debit card, rewards card, etc., in order to relieve the account holder of the burden of having to perform certain account management functions. An account holder provides information on the designated assistant, such as, for example, name, address, and telephone number, to the transaction instrument issuer (for instance, American Express) through one of a variety of mechanisms (e.g., via a paper or online enrollment form).

Normally, the designated assistant is restricted to such management functions as described above. However, in certain situations, it may be the case that the designated assistant is authorized to make certain categories of purchases or make specific representations using the financial transaction instrument, on behalf of the account holder. For instance, under such circumstances as perhaps in the context of a corporate card, the designated assistant may be authorized to make travel arrangements, such as purchasing airline tickets and making lodging reservations, for the account holder.

Once this information is stored in the issuer's designated assistant system, the designated assistant is then authorized to manage the transaction account on behalf of the account holder, to an extent dependent on the level of access, as discussed below. The management functions performed by the designated assistant may include, for example, obtaining statements, reviewing and verifying transactions, disputing transactions, setting up automated account alerts, and disputing finance changes and late fees.

The present invention may provide an account holder with the option of setting a particular level of access at which the designated assistant is authorized to manage the transaction account. Each of the levels corresponds to a predetermined set of management functions the assistant is allowed to perform. Alternatively, the system may provide a single level of access for designated assistants, which includes a predetermined subset of management functions. It is also within the scope of the present invention to provide the account holder with the ability to select individual authorization rights, in effect defining a customized level of authorization to meet that account holder's needs.

If multiple access levels are provided, the broadest level may give the designated assistant unrestricted access to perform any function associated with the transaction account that can be performed by the account holder (apart from making a purchase). Alternatively, the broadest level of access may exclude certain functions, such as the ability to change the mailing address for the account. The other levels restrict the assistant to particular subsets of the management functions associated with the transaction account. For example, a level may be provided that only allows the assistant to view and retrieve transaction data. Another level may permit the assistant also to request and obtain from an operator additional detail about and back-up documentation for particular transactions, to dispute any that the account holder may believe not to be genuine, and the assistant may in addition be authorized at this level to advise the transaction card issuer that the account holder disputes a particular charge, either by speaking with an operator, via e-mail or using a web page, according to the means permitted by the transaction card issuer for such communications. Particularly if the assistant has a relatively high level of authorization permitting them to advise the transaction card issuer that a charge is disputed or to change contact information of the account holder, the issuer can send a confirmatory communication to the account holder alone, or to both the account holder and the assistant. Again, in designating the assistant, the account holder may be given the ability to select, within certain limits, to whom and under what circumstances such confirmatory messages will be sent.

The assistant may be designated as part of the initial application process for the transaction account. Alternatively, the assistant may be designated in an enrollment process relating to an existing transaction account. In either case, information on the designated assistant is stored in the transaction instrument issuer's designated assistant system, so that it may be accessed by customer service operators for verification purposes.

An account holder may designate more than one assistant to manage the account holder's transaction account and, for example, could assign each assistant a different level of management access. Moreover, one assistant may be designated by several account holders to manage each of their respective transaction accounts at desired levels of access.

The terms "user", "end user", "consumer", "customer", "participant", "owner", "requestor" and/or the plural form of these terms are used interchangeably herein to refer to those persons or entities capable of accessing, using, being affected by and/or benefiting from the present invention.

The term "designated assistant" refers to any individual who is given authorization by a transaction account holder to manage or administer the transaction account. The designated assistant may be, for example, an executive assistant who works for or is supervised by the account holder.

A "financial instrument issuer" is any entity that maintains a transaction account for customers to conduct financial transactions using a financial transaction instrument. One example of such entity is American Express, or any other company that provides members with transaction instruments and thereby maintains corresponding transaction accounts.

"Management" is used interchangeably with "administration" and may encompass any action or function performed by a designated assistant with respect to the transaction account that could likewise be performed by the account holder, or a subset of such actions. By extension, the term "management instruction" includes any means for causing the account issuer to execute a management action, such as for example, a telephone call to a customer service operator. An encryption key is electronically forwarded to the designated assistant by the transaction account issuer, enabling them to perform management functions over an online system, and in particular, over the Internet.

The terms "business", "merchant", "vendor", "service" and/or "representative" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an online merchant or the like.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4\ N_5N_6N_7N_8\ N_9N_{10}N_{11}N_{12}\ N_{13}N_{14}N_{15}N_{16}$$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember. A merchant account number may be, for example, any number or alpha-numeric characters that identifies a particular merchant for purposes of card acceptance, account reconciliation, reporting and the like.

II. System

FIG. 1 is a system diagram of an exemplary embodiment of the present invention. The issuer of the transaction instrument maintains a transaction accounts system 100, which processes and stores information data relating to the transaction accounts. Transaction accounts system 100 may include, for example, a server 105 configured to communicate with a number of client computers 110 via a network (depicted in FIG. 1 as lines connecting the server to the client computers), e.g., a local area network (LAN), or a mainframe computer configured to communicate with a number of terminals.

Transaction accounts system 100 includes a transaction database 115 and an account database 120. During operation, any data regarding a particular account holder is stored in the appropriate corresponding database associated with transaction accounts system 100, with server 105 processing the data among the several linked databases and clients.

Account database 120 stores identification, personal, and contact information provided to the transaction instrument issuer by account holders. This account information may, for example, include a holder's name, residence, Social Security number, employer, contact information, and the like.

Transaction database 115 stores all information relating to transactions conducted with the financial transaction instrument linked to the transaction account. For example, when an account holder makes a purchase at a merchant using the transaction instrument, data relating to the transaction is transmitted by the merchant to the account issuer. Assuming the transaction is approved, the card issuer pays the merchant and bills the account holder. The transaction data is stored in transaction database 115 for these purposes and for record keeping purposes, among other uses.

Of course, the present invention is not limited to the databases mentioned above, and additional databases for storing other information may be provided as part of transaction accounts system 100. These databases may be stored as a single database or as physically or logically separate databases, as depicted in FIG. 1. The physical storage device or devices may be either internal or external to transaction accounts system server 105.

As noted above, there are one or more client computers 110 associated with transaction accounts system 100 that are capable of accessing this system to retrieve information from databases 115 and 120. It is to be understood that although only one client 110 is depicted in FIG. 1, there may be numerous clients connected to transaction accounts server 105 via various types of network and direct connections.

Also illustrated in FIG. 1 is a designated assistant system 125 in communication with the transaction accounts system 100 via a network, such as a LAN or the Internet. The designated assistant system 125 may, for example, include a server 130 configured to communicate via a LAN, or any other conventionally known set of links, with a number of client computers 110. In such an embodiment, the server 130 processes and stores information relating to designated assistants who are authorized to manage transaction accounts on behalf of the account holders.

System 125 includes a designated assistant database 135 that stores management data, which is identification, personal, and contact information relating to the designated assistants. Database 135 may be implemented, for example, as a Microsoft® Access database running on a server. The physical device or devices on which designated assistant database 135 is stored may be either internal or external to the designated assistant system server.

The management data may include, for example, the assistant's name, Social Security number, contact information, the level of access at which they are authorized to manage a transaction account, and the like. This data, among other uses, can be employed as assistant authentication data, allowing the identity of the designated assistant to be verified by the account issuer. This data also allows the account issuer to provide the designated assistant with general information relating to the management of accounts by assistants. For example, when an assistant is first designated, the account issuer may send to the assistant information on the various means of accessing the account holder's transaction account and the terms and conditions relating to such access. In addition, this information relating to the assistant may be used by the transaction card issuer in sending a confirmatory e-mail to the account holder and their assistant subsequent to the assistant performing certain management functions on the account holder's behalf, as described in more detail below.

As noted above, a number of client computers 110 are connected to designated assistant system 125 to allow access to the designated assistant data. For example, a customer service operator working for the transaction instrument issuer may access the designated assistant information to allow the operator to verify that a caller has proper authorization to assist in managing the account. Alternatively, as discussed below, the operator may access the designated assistant information through transaction accounts system 100.

In FIG. 1, transaction accounts system 100 and designated assistant system 125 are connected by an electronic link 140, such as a network or other type of electronic link. In this particular embodiment, link 140 allows information to pass between systems 100 and 125 in order to synchronize records in systems 100 and 125. For example, when the transaction instrument issuer receives the designation of an assistant from an account holder, the authorization may be automatically relayed from designated assistant system 125 to transaction accounts system 100 for appropriate processing, updating, and storage in account database 120. Link 140 between systems 100 and 125 may allow for automatic electronic updating of designated assistant information in transaction accounts system 100.

In an alternative embodiment, designated assistant system 125 and transaction accounts system 100 need not be electronically connected. In such case, the designated assistant information may be entered into the corresponding systems separately. Synchronization between the two systems may be carried out by a manual procedure of periodically updating the information with the appropriate additions, changes, or deletions.

FIG. 1 likewise depicts client computers 110 connected both to transaction accounts and designated assistant systems 100 and 125, respectively. Using these client computers 110, operators are able to access both the transaction accounts system information and the designated assistant information. Such clients may take the form of, for example, personal computers, workstations, or other terminals from which data, stored on both systems, may be retrieved.

Figure 2:
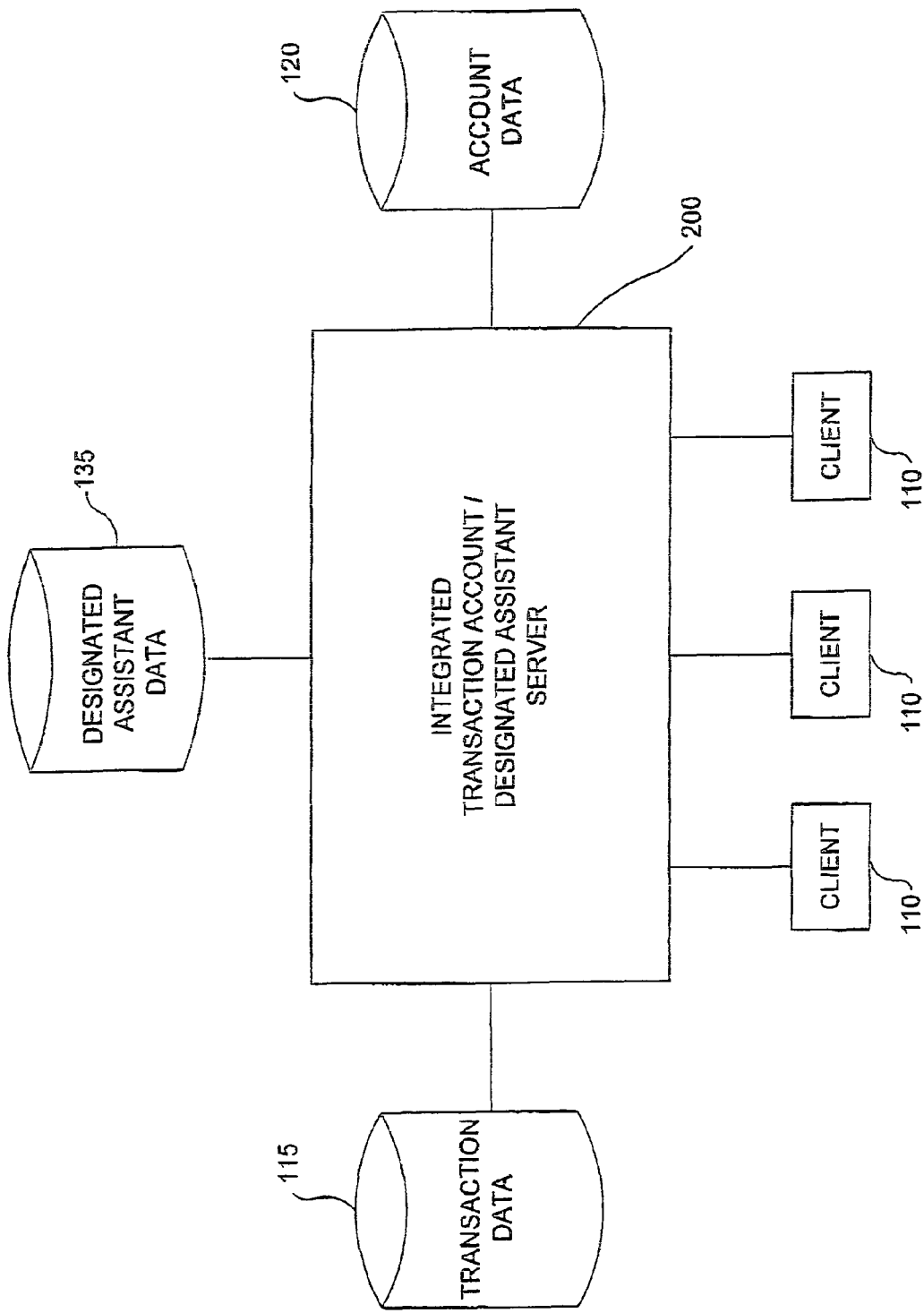
FIG. 2 is a block diagram illustrating an integrated transaction account-designated assistant system maintained by the transaction instrument issuer in accordance with one embodiment of the present invention.

In yet another embodiment of the present invention, the transaction accounts and designated assistant servers may be integrated, as illustrated in FIG. 2. In this configuration, both servers are provided within a single operating unit, an integrated server 200, that performs the functions of both designated assistant server 130 and transaction accounts server 105 in the embodiment of FIG. 1. Integrated server 200 is accessed by individual client computers 110.

In this embodiment, integrated server 200 is connected with a number of databases, including an account database 120, a transaction database 115, and a designated assistant database 135. Of course, the present invention is not limited to only these databases, and could certainly accommodate additional databases. The present databases may be stored as either a single or, otherwise, as physically or logically separate databases. Moreover, both an internal and external physical storage device or devices are contemplated by the present invention. Advantageously, integrating the two separate servers obviates the need for manual updating of each respective server with the corresponding designation and transaction or account data.

Integrated server 200 can also be accessed at several locations through client computers 110. As with the other embodiments, client computers 110 are not limited to any particular form, and can be implemented as personal computers, terminals, workstations, etc.

Figure 3:
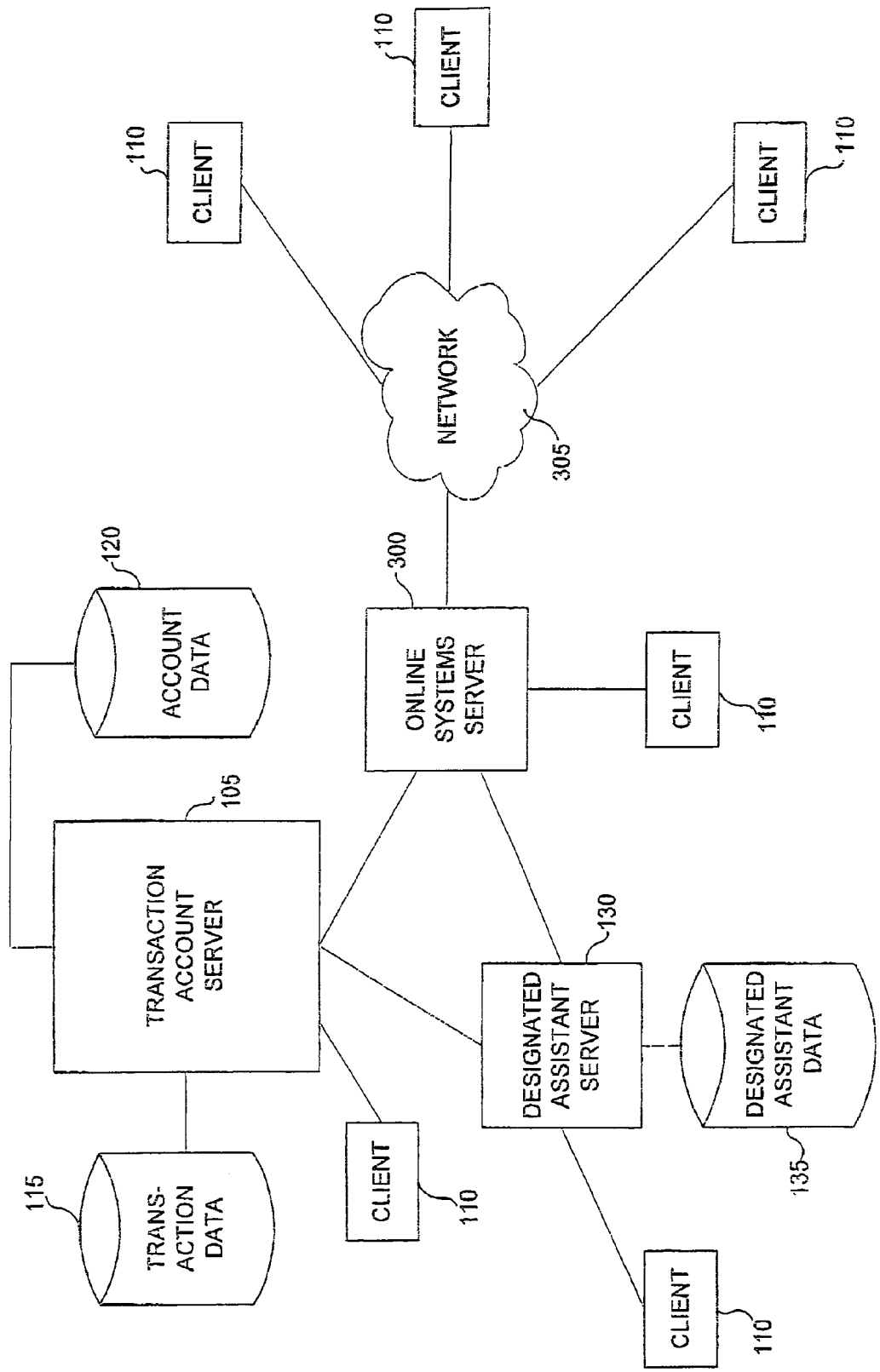
FIG. 3 is a block diagram illustrating a transaction accounts system and a designated assistant system, both linked to an online systems server that is connected to a network and maintained by the transaction instrument issuer in accordance with one embodiment of the present invention.

In other embodiments, as illustrated in FIG. 3, transaction accounts server 105 and designated assistant server 130 may be connected to an online systems server 300, in order to make these systems accessible from remote locations over a network 305, e.g., the Internet. As used in this embodiment, the term "remote locations" is intended to cover any access points outside the facility of the transaction instrument issuer. As in the previously described embodiments, transaction accounts server 105 is in connection with designated assistant server 130, both of which are connected to online systems server 300 and capable of being accessed by client computers 110. Each of these servers is likewise linked to various databases as described above, such as an account database 120, a transaction database 115, and a designated assistant database 135.

FIG. 3 presents online systems server 300, linked to both transaction accounts and designated assistant servers. Online server 300 may be any server known in the art, capable of supplying the information from any database linked to either server 105 or 130 to a plurality of client computers 110 over network 305 such as, for example, the Internet. The content of the information provided may be written and subsequently viewed in any conventional network language and/or graphics format including HTML, Java Script, XML, and the like.

Information may be retrieved from the online systems server 300 by a client computer 110, which may be located at the facility of the transaction instrument issuer. Although in FIG. 3 client computer 110 is only connected to online server 300 itself, in an alternate embodiment client computer 110 could, in addition, be connected directly to designated assistant server 130. Moreover, the present embodiment is designed to allow both servers to be accessed from remote locations by client computers 110.

Figure 4:
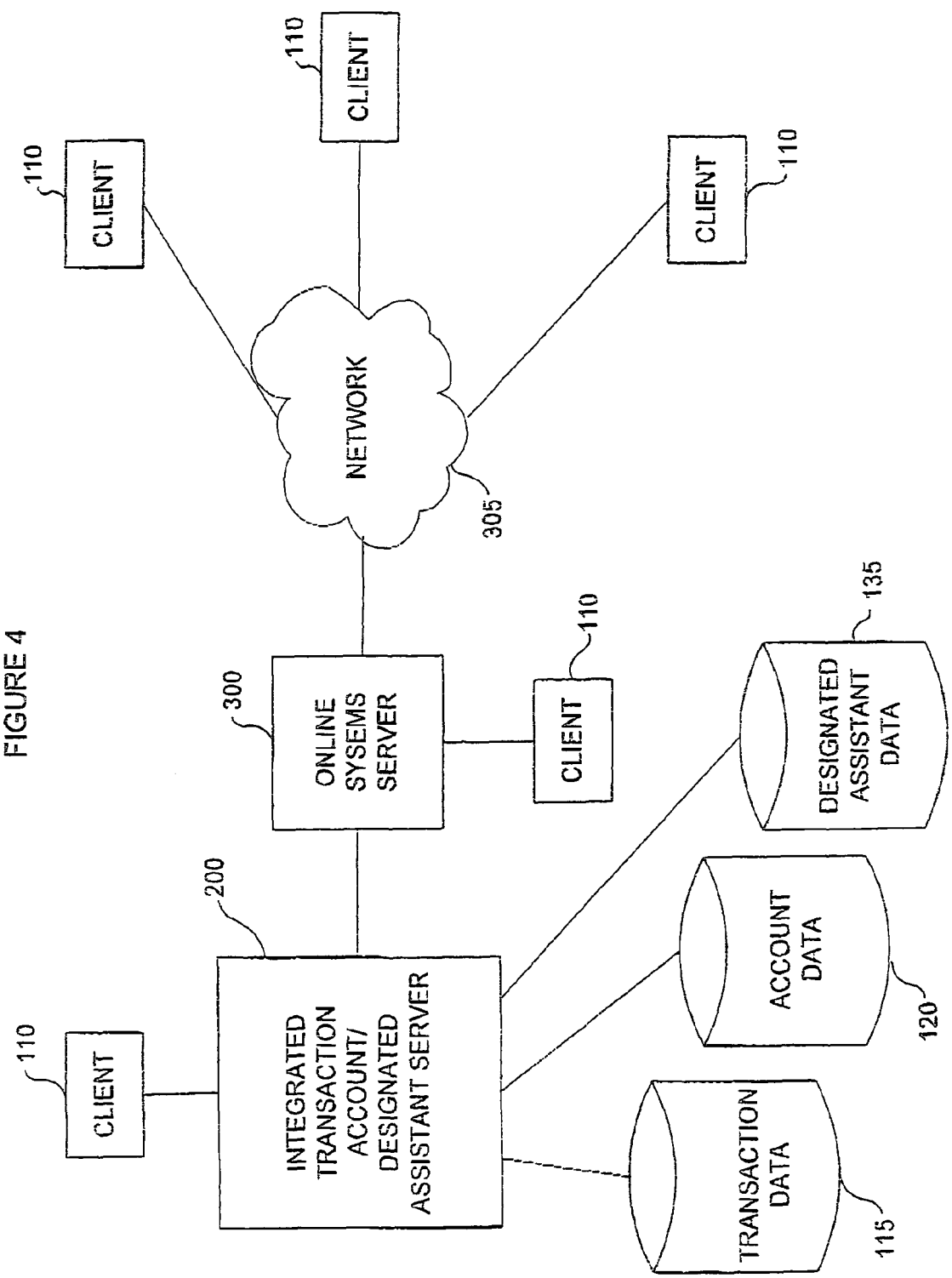
FIG. 4 is a block diagram illustrating an integrated transaction account-designated assistant system, linked to an online systems server that is connected to a network and maintained by the transaction instrument issuer in accordance with one embodiment of the present invention.

As shown in FIG. 4, yet another embodiment of the present invention provides the transaction accounts server and designated assistant server integrated within a single server 200, which is connected to an online systems server 300. The online systems server 300 in turn enables access to the integrated server 200 by client computers 110 over a network 305. As with the integrated embodiment of FIG. 2, the present integrated server 200 is in connection with a number of databases including, but not limited to, an account database 120, a transaction database 115, and a designated assistant database 135.

Integrated transaction account/designated assistant server 200 can be accessed either through one of client computers 110 directly linked to it or through online systems server 300. Client computers 110 may be located on the premises of the transaction instrument issuer for use by customer service operators. While only single client computers 110 are represented in FIG. 4 as being linked to online systems server 300 and integrated server 200, respectively, the present invention does not preclude a plurality of such clients from being connected thereto.

III. Process

Figure 5:
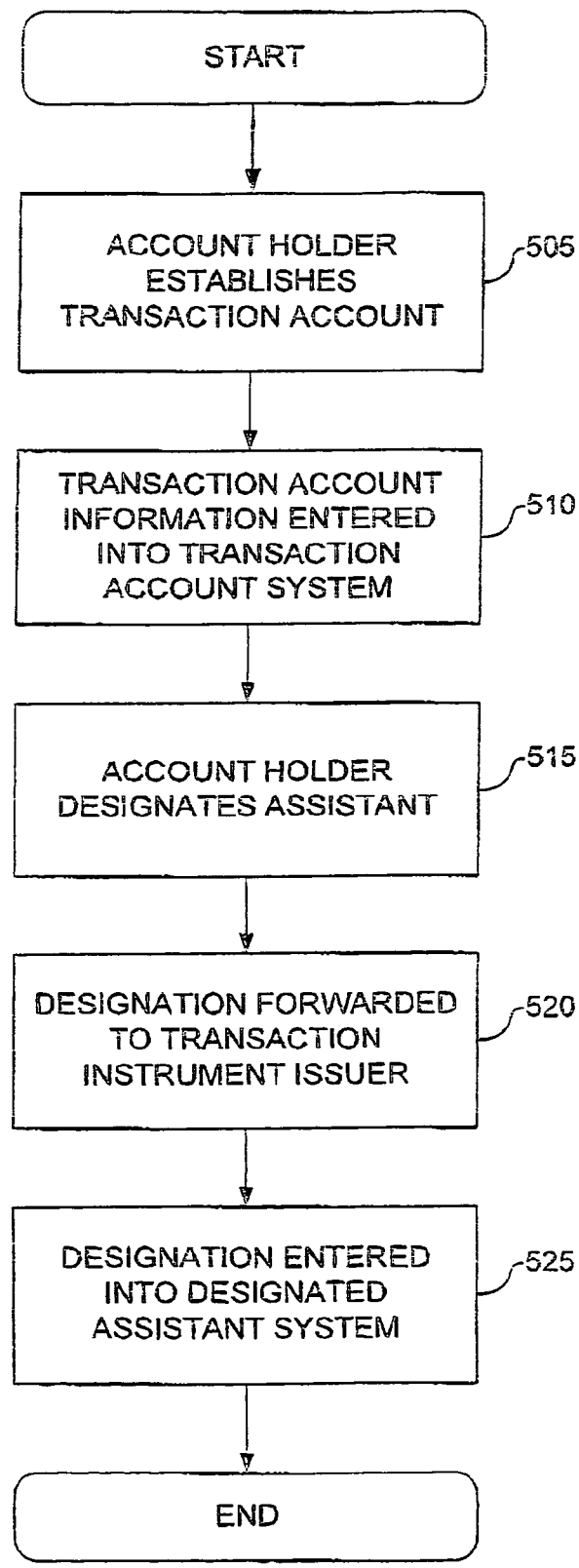
FIG. 5 is a flowchart illustrating a process for establishing a transaction account, along with designation of an assistant for management of the transaction account in accordance with the present invention.

FIG. 5 is a flowchart illustrating a designated assistant enrollment process 500 in accordance with an embodiment of the present invention. The process may begin with a customer establishing a transaction account associated with a financial transaction instrument (step 505), or alternatively, the customer may have an existing transaction account. The customer may establish the transaction account with a transaction instrument issuer by completing an application, which may be, for example, a paper form mailed or sent by facsimile to the account issuer, or it may be an online form transmitted to the account issuer via the Internet. The account issuer enters the information provided by the customer into a transaction accounts system (step 510) that, as discussed above, handles the storage and processing of transaction and account data for accounts linked to the financial transaction instrument.

Once a transaction account is established, the account holder is able to designate one or more assistants to administer the account on their behalf (step 515). To do so, the account holder may complete a designated assistant enrollment form, which is forwarded to the transaction instrument issuer (step 520). The form may be for example, a paper form mailed or sent by facsimile to the account issuer, or it may be an online form transmitted to the account issuer via the Internet. Alternatively, the customer may designate one or more assistants as part of completing the initial transaction instrument application by filling in a particular portion of the form provided for that purpose.

The assistant enrollment form, whether separate from or combined with the initial application, provides the procedural and legal basis necessary to effectuate authorization enabling the designated individual(s) to manage or administer the transaction account, including specifying its applicable terms and conditions. It should be understood that the assistant enrollment form is not limited to any specific format or medium. Information relating to the designated assistant is stored in the transaction instrument issuer's designated assistant system, so that it can be accessed by customer service operators for verification purposes. It should be noted that if the holder of the transaction account wishes to designate more than one assistant, all the assistants can be designated at the same time, or an additional assistant can be designated subsequent to (and in a separate transaction from) the designation of the first assistant.

In designating an assistant, the account holder may select a level of management access at which the assistant may be authorized to manage the transaction account. For example, the access level may be selected on the designated assistant enrollment form. As discussed above, each of the levels corresponds to a predetermined set of management functions the assistant is allowed to perform. Alternatively, the system may provide only a single level of access for designated assistants, which includes a predetermined subset of management functions. Also, if the system supports selection of various access levels, and if more than one assistant is designated, the holder of the transaction account can optionally designate different access levels for different assistants. Alternatively, the system can be constructed to permit selection of only one access level for all the assistants designated with respect to a given transaction account.

If multiple access levels are provided, the broadest level may give the designated assistant unrestricted access to perform any function associated with the transaction account that can be performed by the account holder. Alternatively, the broadest level of access may exclude certain functions, such as the ability to change the mailing address for the account. The other levels restrict the assistant to particular subsets of the management functions associated with the transaction account.

For example, the level of management access may permit the designated assistant to perform all functions available to the account holder, but may exclude the authority to alter the account holder's personal information, such as the account mailing address. As a further example, an account holder may restrict the designated assistant to the level of viewing and retrieving transaction information and conducting general account inquiries.

As noted above, the designation information is entered by the account issuer into a designated assistant system as management data (step 525). This management data may, by way of non-limiting example, take the form of an electronic entry created within the transaction instrument issuer's designated assistant database (see element 135 in FIGS. 1-4). The management data may include personal and contact information relating to the designated assistant, such as the name of the assistant, their Social Security number, address, telephone number, e-mail address, and any other identifying information the transaction account issuer may require. When the designated assistant seeks to execute a management instruction relating to the account, for example, by making a phone call to the transaction instrument issuer, the customer service operator accesses the management data in the designated assistant system to verify the identity of the assistant and their authority to administer the transaction account.

In the embodiment discussed above with respect to FIGS. 3 and 4, the management data may constitute a management account that enables the designated assistant to access the account holder's transaction account via an online system in order to execute management instructions. In such a case, the designated assistant may obtain access by inputting a user identifier and password. With this management account the designated assistant is able to retrieve information from both the designated assistant and transaction accounts systems, and moreover, to execute account management functions in accordance with the assistant's authorized level of access. For example, the assistant may be able to change their own contact information, such as their phone number or email address, and may also be able to retrieve and review information relating to transactions performed using the transaction instrument, track the status of a particular transaction or management function, or even receive a confirmatory e-mail of an executed transaction.

In addition to the steps described above for designating an assistant, the account holder may also change the designated assistant, or cancel the authorization of a designated assistant altogether. To do so, the account holder may, for example, submit an appropriate form or access a particular webpage in the online account management system. Such forms are not limited to any particular format or medium.

The account holder may designate more than one assistant to manage or administer their transaction account. Under such an embodiment, the account holder proceeds according to the process described above, but may, for example, submit a separate designation form for each additional assistant, indicating on the form that the designation is made in addition to any previous designations. Alternatively, a single form may provide for the designation of multiple assistants. Moreover, the present invention may allow the account holder to set different levels of access for each of their designated assistants, thus allowing greater flexibility in distributing responsibility for account management functions.

According to the present invention, it is also the case that a single assistant may be designated by more than one account holder. That is, in such instance the designated assistant would be authorized to manage a plurality of distinct transaction accounts, each linked to a separate transaction account instrument issued to a separate account holder. Under this particular arrangement, the present invention may additionally enable the account holders each to select a different level of management access to which the common designated assistant is authorized to administer their respective transaction accounts.

Figure 6:
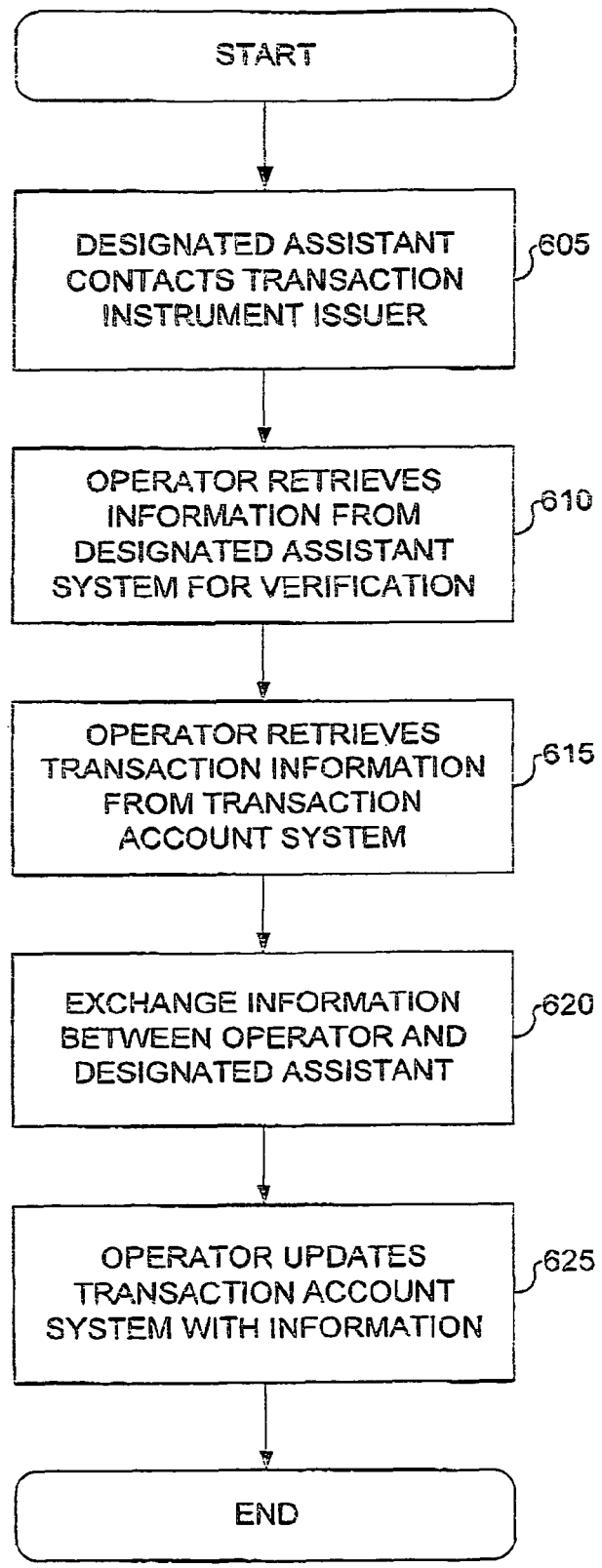
FIG. 6 is a flowchart illustrating an exemplary management instruction conducted by a designated assistant on behalf of the account holder.

FIG. 6 shows an example of how a designated assistant manages a holder's transaction account as in the case, for example, of an executive assistant administering their employer's corporate card account (or several executives' accounts). The account holder establishes a transaction account with the account issuer and designates an assistant as described above or may have previously completed these steps. In this example, the assistant telephones the transaction instrument issuer (step 605) to dispute a purchase appearing on the account holder's monthly statement. A customer service operator answers the call and asks for identification information from the executive assistant before accessing the account information. The operator, working from a client computer (e.g., element 110 in FIGS. 1-4), accesses the designated assistant system and retrieves the management data to verify the identity of the assistant (step 610). The operator also determines the level of access specified for the assistant, which defines the set of management functions the assistant is authorized to perform.

Alternatively, the assistant may encounter an automated system for account inquiries, set up by the transaction account issuer. In such instance, the assistant would need to provide the same identification information prior to gaining access to management data. If an automated system is used, it may be of any of various types, including one in which the assistant accesses a webpage and enters the required information for authentication and for performing the desired management functions through dialog boxes or the like. Another form that such an automated system could take is one accessed via a voice link, with the assistant receiving stored or voice-synthesized information in audio form, and inputting the required information via a keypad.

The operator or automated system then accesses the transaction accounts system to retrieve the desired account and/or transaction data (step 615). For example, the operator may retrieve the date of the disputed purchase, the vendor, and the amount. The operator may accept instructions from the executive assistant for resolving the disputed purchase, if the assistant has the appropriate level of access to perform this function (step 620). This may result in the operator updating the data stored in the transaction database (step 625), such as to mark the transaction as disputed, depending upon outcome of the exchange with the assistant.

IV. Example Implementations

The present invention (i.e., system 100, process 500 or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 7:
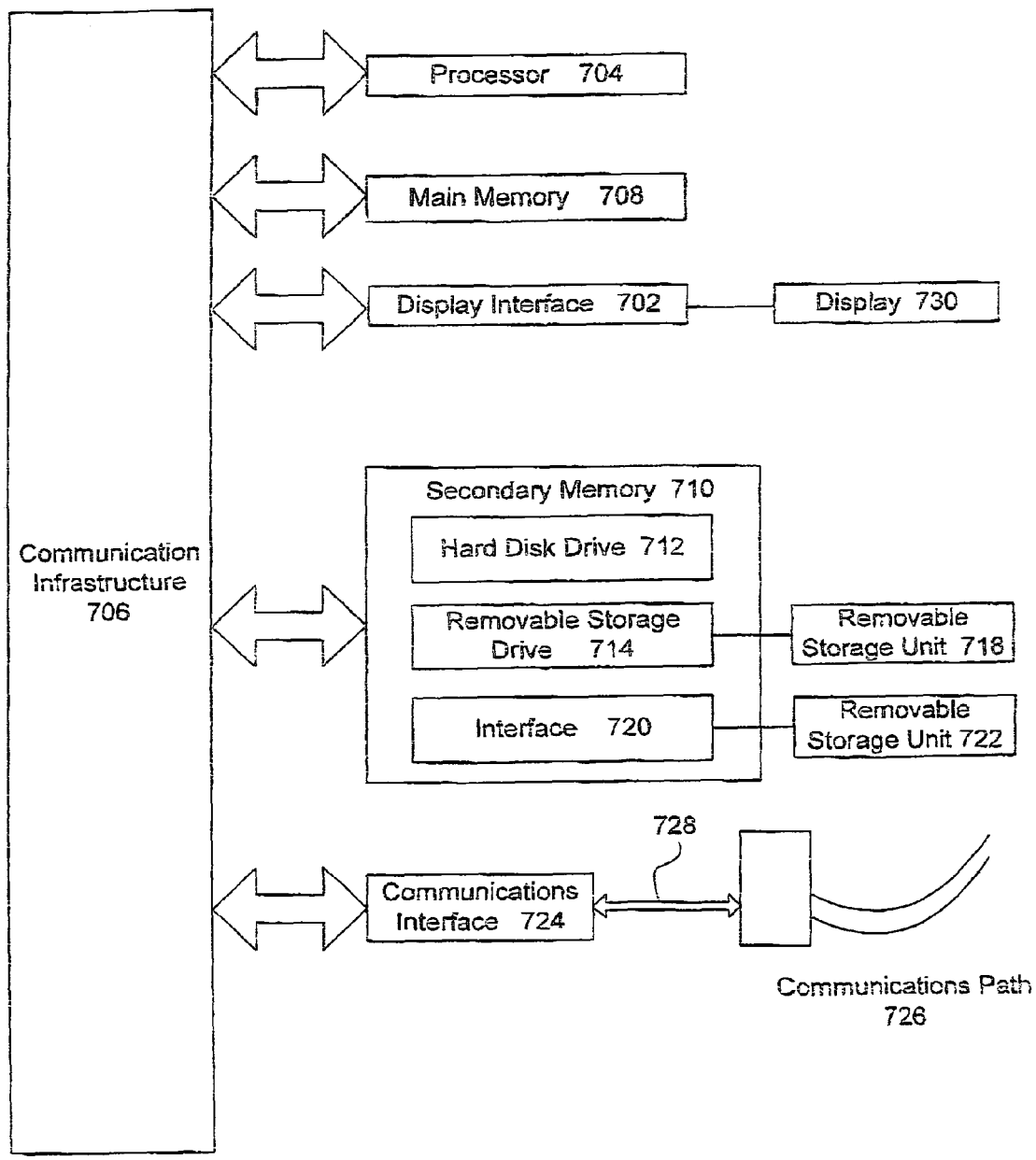
FIG. 7 is a block diagram of an exemplary computer system useful for implementing the present invention.

In fact, in one embodiment, the invention is directed toward one or more computer systems capable of carrying out the functionality described herein. An example of a computer system 700 is shown in FIG. 7.

Computer system 700 includes one or more processors, such as processor 704. Processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from communication infrastructure 706 (or from a frame buffer not shown) for display on display a unit 730.

Computer system 700 also includes a main memory 708, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, etc. Removable storage drive 714 reads from and/or writes to a removable storage unit 718 in a well known manner. Removable storage unit 718 represents a floppy disk, magnetic tape, optical disk, etc., which is read by and written to by removable storage drive 714. As will be appreciated, removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. Signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable computer system 700 to perform the features of the present invention, as discussed herein. In particular, the computer programs, when executed, enable processor 704 to perform the features of the present invention. Accordingly, such computer programs represent controllers of computer system 700.

In an embodiment where the invention is implemented using software, the software may be stored in a computer program product and loaded into computer system 700 using removable storage drive 714, hard drive 712 or communications interface 724. The control logic (software), when executed by processor 704, causes processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
    enabling, by a computer based system for delegating authorization, a first transaction account holder to delegate management of transaction account data associated with a transaction account to a second user, wherein the first transaction account holder has transaction account usage authorization and the second user does not have transaction account usage authorization;
    accepting, by the computer based system, a transaction account data access designation of the second user from the first transaction account holder;
    enabling, by the computer based system, review of transaction account usage data, based on the designation; and
    enabling, by the computer based system, inquiries of a transaction account issuer regarding transaction account usage data, based on the designation.

2. The method of claim 1, further comprising storing, by the computer based system, a respective level of management access defining the transaction account data access designations that the second user is authorized to perform in managing the transaction account data.

3. The method of claim 1, further comprising enabling, by the computer based system, a second account holder to delegate management of second transaction account data associated with a second transaction account to the second user, wherein the second transaction account holder has second transaction account usage authorization and the second user does not have second transaction account usage authorization.

4. The method of claim 1, wherein enabling the first transaction account holder to delegate management of the transaction account usage data associated with the transaction account to the second user is performed contemporaneously with an opening of the transaction account.

5. The method of claim 1, wherein the enabling the first transaction account holder to delegate management of the transaction account usage data associated with the transaction account to the second user is performed after the transaction account is opened and used in a financial transaction.

6. The method of claim 1, wherein the method further comprises enabling alteration of a stored level of management access of the second user to a new level of management access.

7. The method of claim 1, further comprising enabling the first transaction account holder to terminate transaction account data access of a second user.

8. The method of claim 1, wherein the second user may communicate via the Internet with the computer based system to review transaction account usage data and inquire of the transaction account issuer regarding transaction account usage data.

9. The method of claim 1, wherein the second user may communicate via a communication device with the computer based system to review transaction account usage data and inquire of the transaction account issuer regarding transaction account usage data.

10. The method of claim 9, wherein the communication device comprises at least one of a telephone, a cellular telephone, and a facsimile.

11. The method of claim 1, wherein the second user is an employee working for the holder of the transaction account.

12. A computer based system, comprising:
   a computer network communicating with a memory;
   the memory communicating with a processor; and
   the processor, when executing a computer program for delegating authorization, is configured to:
      enable a first transaction account holder to delegate management of transaction account data associated with a transaction account to a second user, wherein the first transaction account holder has transaction account usage authorization and the second user does not have transaction account usage authorization;
      accept a transaction account data access designation of the second user from the first transaction account holder;
      enable review of transaction account usage data, based on the designation; and
      enable inquiries of a transaction account issuer regarding transaction account usage data, based on the designation.

13. The computer based system of claim 12, wherein the processor, when executing a computer program for delegating authorization, is further configured to store a respective level of management access defining the access designations that the second user is authorized to perform in managing the transaction account data.

14. The computer based system of claim 12, wherein the processor, when executing a computer program for delegating authorization, is further configured to enable a second account holder to delegate management of second transaction account data associated with a second transaction account to the second user, wherein the second transaction account holder has second transaction account usage authorization and the second user does not have second transaction account usage authorization.

15. The computer based system of claim 12, wherein enabling the first transaction account holder to delegate management of the transaction account usage data associated with the transaction account to the second user is performed contemporaneously with an opening of the transaction account.

16. The computer based system of claim 12, wherein the enabling the first transaction account holder to delegate management of the transaction account usage data associated with the transaction account to the second user is performed after the transaction account is opened and used in a financial transaction.

17. The computer based system of claim 12, further comprising enabling alteration of a stored level of management access of the second user to a new level of management access.

18. The computer based system of claim 12, further comprising enabling the first transaction account holder to terminate the transaction account data access of the second user.

19. The computer based system of claim 12, wherein the second user is an employee working for the holder of the transaction account.

20. A non-transitory computer readable medium having stored thereon sequences of instruction, the sequences of instruction including instruction which, when executed by a computer-based system for delegating authorization, causes the computer based system to perform operations comprising:
   enabling, by the computer based system, a first transaction account holder to delegate management of transaction account data associated with a transaction account to a second user, wherein the first transaction account holder has transaction account usage authorization and the second user does not have transaction account usage authorization;
   accepting, by the computer based system, a transaction account data access designation of the second user from the first transaction account holder;
   enabling, by the computer based system, review of transaction account usage data, based on the designation; and
   enabling, by the computer based system, inquiries of a transaction account issuer regarding transaction account usage data, based on the designation.

* * * * *